Dec. 31, 1929.  J. E. BLAKE  1,742,127
SLED
Filed Jan. 23, 1928
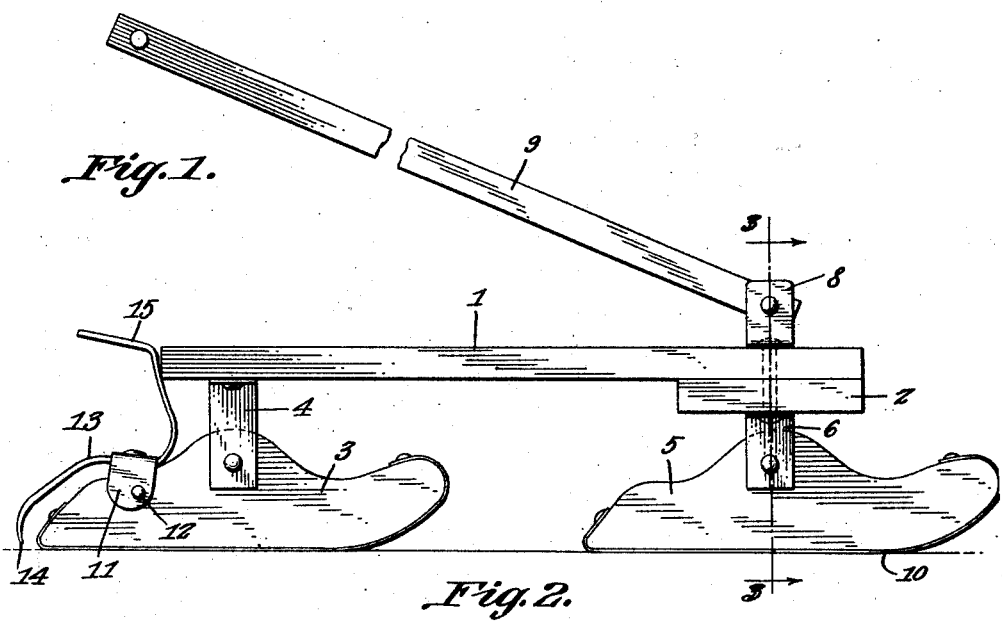
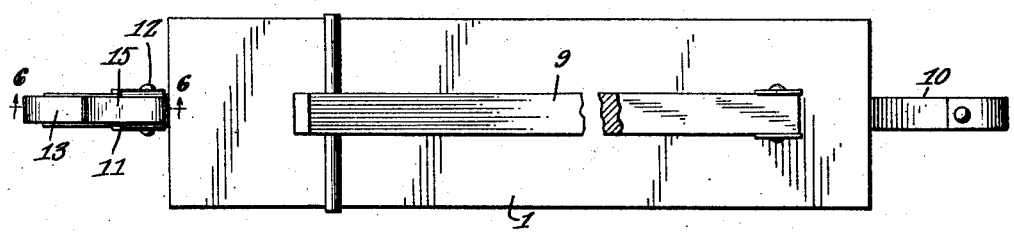
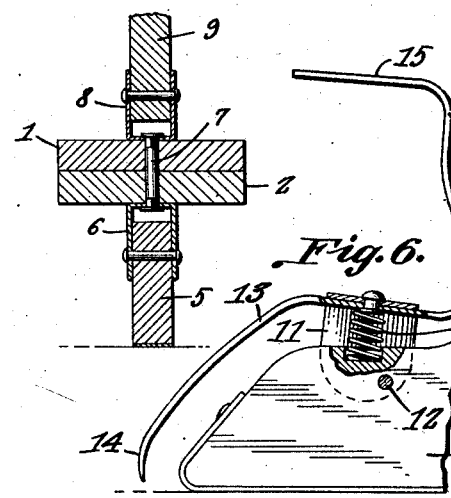
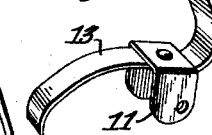
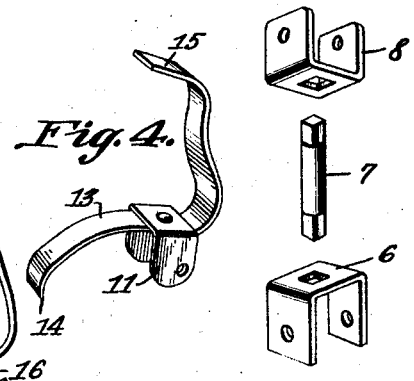
Joseph E. Blake, INVENTOR
BY Victor J. Evans
ATTORNEY Patented Dec. 31, 1929

1,742,127

UNITED STATES PATENT OFFICE

JOSEPH EDMUND BLAKE, OF GARDNER, MASSACHUSETTS

SLED

Application filed January 23, 1928. Serial No. 248,886.

This invention relates to a scooter sled, the general object of the invention being to provide the sled with a pair of runners, each of which is pivoted about a horizontal axis and the front of which is pivoted about a vertical axis, with a handle for turning the front runner about its vertical axis so as to guide the sled.

Another object of the invention is to place a brake on the rear runner, the brake being so formed that it can be operated by the foot of the user.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the invention.

Figure 2 is a plan view thereof.

Figure 3 is a section on line 3—3 of Figure 1.

Figure 4 is a view of the brake.

Figure 5 shows the parts for connecting the front runner and handle together and for pivotally supporting the front runner from the body of the sled.

Figure 6 is a section on line 6—6 of Figure 2.

In these views, 1 indicates a body or platform of the sled which is provided with a reinforcing piece 2 at its front end. The rear runner 3 is pivoted to move about a horizontal axis between the brackets 4 which are fastened to the under side of the platform adjacent its rear end. The front runner 5 is pivoted to move about a horizontal axis between the depending parts of a bracket 6 which is fastened to the lower end of a pivot pin 7 which passes through holes formed in the front end of the platform and in the piece 2. A U-shaped bracket 8 is connected to the upper end of the pivot pin 7 and a handle 9 is pivoted between the upwardly extending limbs of this bracket. Each runner is provided with a metal strip 10 on its under edge, the ends of the strip passing over the front and rear ends of the runner.

A U-shaped bracket 11 is pivoted to the rear part of the rear runner by the eccentrically arranged pivot pin 12 and a strip of metal 13 is fastened intermediate its ends to the bight of the bracket 11. The part of the strip in rear of the bracket is bent downwardly over the rear end of the runner with its extremity sharpened, as at 14. The other part of the strip is curved upwardly, with its upper end bent at an angle to form a comparatively flat part 15 at the rear of the platform so that one foot of the user can be pressed against said part 15 to cause the sharpened end 14 to engage the surface over which the sled is passing and thus act as a brake for the device. A coil spring 16 has one end arranged in a socket in the upper edge of the rear runner and its other end engaging that part of the strip 13 which is fastened to the bight of the bracket 11 so that this spring will act to hold the brake in operative position, with an upper part of the strip pressing against the rear end of the platform.

From the foregoing it will be seen that by having the runners pivoted as shown, they can readily pass over rough surfaces and that by having the front runner pivotally supported from the platform and connected with the handle, the device can be steered by the user standing on the platform. The brake can be easily applied by the user pressing with one foot on the part 15 so as to rock the brake and cause the end 14 to engage the surface. Due to the eccentric arrangement of the pin 12, the spring 16 acts to hold the brake in inoperative position.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

In combination with a sled, an inverted U-shaped bracket having its limbs pivoted eccentrically to the rear part of the rear runner thereof, a strip passing under the bight of the bracket and fastened thereto, the lower portion of the strip extending downwardly with its lower end pointed to form a brake, the upper portion of the strip extending upwardly and having a substantially straight extremity for forming a foot engaging portion and a spring having its lower end engaging a part of the rear of the rear runner and its upper end engaging that part of the strip which is fastened to the bracket, the strip being attached in the rear of the pivot of the bracket whereby the bracket and strip are normally held in a position with the lower end of the strip above the surface engaged by the sled.

In testimony whereof I affix my signature.

JOSEPH EDMUND BLAKE.